(12) United States Patent
Mueller et al.

(10) Patent No.: US 11,493,896 B2
(45) Date of Patent: Nov. 8, 2022

(54) TURN-OFF DEVICE FOR COMPONENTS IN SAFETY-CRITICAL SYSTEMS

(71) Applicant: Robert Bosch GmbH, Stuttgart (DE)

(72) Inventors: Bernd Mueller, Leonberg (DE); Felix Laub, Leonberg (DE); Liviu Vasiluta, Malmsheim (DE); Manuel Raible, Rutesheim (DE); Mateusz Marszalski, Ludwigsburg (DE); Nikolaos Avramidis, Schwaebisch Gmuend (DE); Sandra Hermoso Peralo, Stuttgart (DE); Wolfgang Kostorz, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/358,104

(22) Filed: Mar. 19, 2019

(65) Prior Publication Data
US 2019/0332076 A1 Oct. 31, 2019

(30) Foreign Application Priority Data
Apr. 25, 2018 (DE) .......................... 102018206382.6

(51) Int. Cl.
*G05B 19/048* (2006.01)
(52) U.S. Cl.
CPC .. *G05B 19/048* (2013.01); *G05B 2219/24008* (2013.01); *G05B 2219/25252* (2013.01)

(58) Field of Classification Search
None
See application file for complete search history.

(56) References Cited

U.S. PATENT DOCUMENTS

| | | | | |
|---|---|---|---|---|
| 6,115,831 A | * | 9/2000 | Hanf | B60R 16/0315 714/43 |
| 2003/0105891 A1 | * | 6/2003 | Moriyama | G05B 19/0423 710/2 |
| 2010/0222895 A1 | * | 9/2010 | Seiler | H04L 12/12 700/16 |
| 2015/0254973 A1 | * | 9/2015 | Fruhauf | G08C 17/02 340/870.07 |

FOREIGN PATENT DOCUMENTS

DE 102012209144 A1 12/2013

* cited by examiner

*Primary Examiner* — Sean Shechtman
(74) *Attorney, Agent, or Firm* — Norton Rose Fulbright US LLP; Gerard Messina

(57) ABSTRACT

A turn-off device for a sensor, an actuator or a control unit for a vehicle or for an industrial facility, the sensor, the actuator or the control unit being connectable via a PHY interface to a communication network, via which the sensor, the actuator or the control unit is able to exchange messages with other units of the vehicle or of the industrial facility, the turn-off device including a blocker, which physically prevents the PHY interface from sending messages to the communication network. A sensor, an actuator or a control unit that includes the turn-off device, a method for functional checking, and an associated computer program are also described.

10 Claims, 4 Drawing Sheets

TURN-OFF DEVICE FOR COMPONENTS IN SAFETY-CRITICAL SYSTEMS

CROSS REFERENCE

The present application claims the benefit under 35 U.S.C. § 119 of German Patent Application No. DE 102018206382.6 filed on Apr. 25, 2018, which is expressly incorporated herein by reference.

FIELD

The present invention relates to a turn-off device, with which a component in a safety-critical system may be wholly or partially disabled in case of an error in order to minimize the effect of the error.

BACKGROUND INFORMATION

Safety-relevant systems play a role at many points in automotive technology. "Fail-safe" control units are very often employed in such case, which may be transferred via suitable safety mechanisms into a safe state in the event of a critical error. These safety mechanisms include, on the one hand, error detection mechanisms which detect critical errors and, on the other hand, a turn-off path which ensures that the safe state is actually assumed in the event of an error.

A method and a system for turning off the power supply of an electrical drive system is German Patent Application No. DE 10 2012 209 144 A1. If a control unit exhibits a malfunction, its power electronics are disconnected.

SUMMARY

A turn-off device for a sensor, an actuator or a control unit for a vehicle or an industrial facility has been developed in conjunction with the present invention. The sensor, the actuator or the control unit is connectable to a communication network via a PHY interface. The sensor, the actuator or the control unit is able to exchange messages via the communication network with other units of the vehicle or of the industrial facility.

A PHY interface, according to the designation of the bit transmission layer (Layer 1) in the OSI layer model as "Physical Layer" is understood to be an interface that provides functional aid in order to establish, terminate, maintain a physical connection to the communication network, and to transmit data via the physical connection.

The communication network may, for example, be a bus system of a vehicle, for example, a CAN bus. The communication network may, for example, also be a field bus system of an industrial facility.

The turn-off device includes a blocker, which physically prevents the PHY interface from sending messages to the communication network.

It has been found that to contain the effects of errors, it is not absolutely necessary to disable the incorrectly activated physical actuator system in the event of an error. Instead, the effects of the error may also be contained by ensuring that the messages relating to the incorrect activation do not reach the actuator system.

This approach makes it easier for multiple reasons, especially in vehicles, to expand the automation of functions to additional areas with the aid of cognitive control units, i.e., in particular, control units based on artificial intelligence and/or on machine learning.

No change to the actuator system is required in order to ensure a safe turn-off path. If cognitive control units on the one hand and the actuator system on the other hand originate from different manufacturers, or if an existing actuator system is to continue to be used, it is often difficult or not possible at all to extend the actuator system by one turn-off path.

A safe turn-off path may also be ensured if the actuator system itself must necessarily remain operative. If, for example, a driver assistance system and/or a system for the at least partially automated driving resort(s) to the braking system as an actuator system, then there are on the whole potentially multiple systems in the vehicle, which make use of one and the same physical braking system as an actuator system. A system for the at least partially automated driving during normal operation may, for example, activate the physical braking system and this activation may be superposed by an additional activation via a separate electronic stability program, ESP, if the ESP is activated at the limits of driving physics. In the event of an error in the ESP system, it is then senseless to completely deactivate the physical braking system, because then the vehicle is immediately no longer drivable. In the case of electrohydraulic brakes, for example, the actuation of the brake pedal by the driver is also received as an electrical signal and fed to the physical braking system as an actuator system. If this actuator system were turned off due to an error in some other control unit, the vehicle could no longer be controlled.

The blocker may be integrated, in particular, into the PHY interface itself. This has the advantage that the PHY interface is then already a complete unit, which ensures the operational safety. However, the blocker may also be situated, for example, outside the PHY interface itself in its external circuitry. This has the advantage that an existing PHY interface may continue to be used.

The blocker may, for example, include an electrical or optical switch, via which the transmission path between the PHY interface and the communication network is guided. A blockade of only the transmission path may be advantageous, for example, so that the sensor, the actuator or the control unit may continue to be influenced in a controlling manner with the aim of restoring the operability. A reset command, for example, may be sent via the receiving path. To save energy, many systems, especially in vehicles, are also put into a sleep mode, from which they are awakened again via the communication network as needed. If, in the event of an error, the PHY interface continues to be operable in the receiving direction, this awakening is still possible and the system is useful, at least to a limited degree.

The blocker may, however, also include a multipolar, electrical switch, via which both the transmission path as well as the receiving path between the PHY interface and the communication network are guided. If this multipolar switch is actuated, the PHY interface may be completely galvanically separated from the communication network as a result. In this way, a bus-type communication network, for example, may be protected from a defective component in the PHY interface that electrically influences even the bus in such a way that the data communication by other users of the communication network is also impaired.

In another advantageous embodiment, the blocker includes an electrical switch, via which the power supply of the PHY interface is guided. In this way, the blocker may be particularly easily coupled to an existing PHY interface, since the switch used need not be designed, for example, for the high frequency used in the data transmission.

All switches may be designed as both resettable as well as non-resettable. Non-resettable switches, for example, are fuses that are blown, or mechanical devices that decouple or cut a line. In the context of an industrial facility, for example, a non-resettable switch may be advantageous in order to force an inspection and repair of the error by technical personnel. In the case of applications in vehicles, however, many errors are transient errors, which automatically disappear again. Then it is advantageous if the switches are resettable, so that the full functionality may be restored again once the error has disappeared.

In another particularly advantageous embodiment, a read-out device is provided for the switching state of the blocker. In this way, the correct function of the blocker may be checked via regular tests. Physical safety devices, in particular, which are actuated rarely or not at all during normal operation are, in the event of an error when they are needed, generally prone to failure. Thus, for example, a relay, which is actuated rarely or never, may stick or mechanically jam due to corrosion. The read-out device may, for example, include a tapping of the signal from a control line, via which the blocker is activated.

The read-out device particularly advantageously includes a measuring device for a physical state variable of at least one element, at which the transmission of messages by the PHY interface fails in the blocked state of the blocker. In the case of a mechanical switch or relay, the physical state variable may, for example, be the position of a corresponding switch element. In the case of a semiconductor switch, for example, a transistor, the switching state may be determined with the aid of electrical state variables. If the blocker controls the power supply of the PHY interface, then a voltage within the PHY interface may, for example, also be tapped as a physical state variable. In this way, it may be more directly controlled whether the activation of the blocker with a turn-off signal was also in fact successful.

The turn-off device need not necessarily be part of the sensor, of the actuator or of the control unit, but may also be retrofitted externally at a suitable location. However, the turn-off device is particularly preferably a part of the sensor, of the actuator or of the control unit. The sensor, the actuator or the control unit as a whole may then be certified as secured against the effects of errors. The present invention therefore also relates to a sensor, to an actuator or to a control unit that includes the described turn-off device.

In one particularly advantageous embodiment, the sensor, the actuator or the control unit includes a microprocessor for generating messages to be sent via the PHY interface. In this embodiment, an additional turn-off device is provided with a blocker, which physically prevents the microprocessor from communicating messages to the PHY interface. The additional turn-off device may be designed, in particular, to deactivate the microprocessor, for example, by disconnecting the power supply.

In this way, a turn-off path that has a dual-channel structure is on the whole implemented, so that the likelihood that, in the event of an error, the turn-off actually functions and the effect of the error may be contained is increased once again. The additional turn-off device also allows for a differentiated response, depending on the type of error, so that only so much functionality is turned off as is necessary to contain the effect of the error. For example, multiple microprocessors for performing various functions may be present in one and the same unit, and which share one and the same PHY interface for the connection with the communication network. If only one of the microprocessors operates incorrectly, this microprocessor may be selectively prevented from sending messages or may be completely deactivated, while at the same time the functions performed by the remaining microprocessors continue to be available.

The additional turn-off device may be designed similarly as previously described for the turn-off device for the PHY interface. Thus, it may, for example, prevent only the transmission of messages to the PHY interface, but allow the reception, so that for the purpose of troubleshooting, the microprocessor may continue to be influenced in a controlling manner. A read-out device, for example, may also be provided for the switching state of the blocker of the additional turn-off device.

The additional turn-off device, similar to the blocker, may be integrated, in particular, into the PHY interface itself, but it may also be situated, for example, outside the PHY interface itself in its external circuitry.

In another particularly advantageous embodiment, a control logic separate from the microprocessor is provided, which is designed to monitor the correct function of the microprocessor and in the event of an error, to activate the additional turn-off device and/or the turn-off device for the PHY interface, with a turn-off signal. In this way, it is ensured that critical errors, in particular, which immediately also disable corresponding self-control functions of the microprocessor, are recognized and limited in their effect.

The control logic may, for example, include a separate microcontroller that includes multiple additional microprocessors. The control logic may particularly advantageously include at least one application-specific integrated circuit (ASIC). The function thereof is no longer changeable afterwards and thus cannot be influenced, for example, by a malfunction of a program memory, or also by malware.

The correct function may be monitored in an arbitrary manner. For example, a watch-dog function may address the microprocessor at regular intervals and check whether the microprocessor provides a meaningful response within a predefined period of time. Other viable signs of the microprocessor such as, for example, a clock signal or a voltage, may also be monitored. The monitoring may also be directed to whether all tasks provided for execution by the microprocessor are still running or whether one of these tasks is stuck for example, in an infinite loop or, for example, has crashed completely as a result of a memory protection error (segmentation fault). This is based on the finding that many errors are caused as a result of one or more tasks no longer running properly and, for example, values, on the basis of which other tasks continue to calculate and generate messages, are no longer updated.

As previously described, the turn-off device is a safety device specifically for the event of an error, which is actuated comparatively rarely during normal operation. To ensure that the turn-off device is functional in the event of an error, it is therefore advantageous to regularly check the function of the turn-off device. The read-out device provided in a described embodiment may be utilized for this purpose. The present invention therefore also relates to a method for checking the function of a turn-off device that is fitted with a read-out device. In this method, the blocker is instructed acted upon by a turn-off signal on the one hand and by a turn-on signal on the other hand. The read-out device is used to check whether the turn-off signal and the turn-on signal transfers the blocker in each case to the correct switching state.

In turn, however, it is not necessary for the functional check that the turn-off device is fitted with a read-out device. The correct function of the turn-off device may also be checked directly, namely, whether the forwarding of messages to the communication network is actually prevented in the event of an error. The present invention therefore also relates to an additional method for checking the function of a turn-off device. In this method, the blocker is acted upon by a turn-off signal. A test message is subsequently delivered to the PHY interface. It is checked whether the PHY interface forwards the test message.

If the turn-off device functions correctly, the test message should not be forwarded if the blocker is effective.

The form in which it may be best observed whether the test message is forwarded by the PHY interface is a function of the specific communication network and of the PHY interface used.

The observation may be made, for example, by another user of the communication network. The observation may, however, also take place inside a sensor, an actuator or a control unit that includes the PHY interface. If, for example, the communication network is a CAN bus, then a loop-back-interface or an error-counter-interface may be used for the observation.

The methods for functional checking may be implemented wholly or partially in software, which is sellable, for example, as an add-on, an update or an upgrade to an existing turn-off device, or to an existing sensor, actuator or control unit including a turn-off device. The present invention therefore also relates to a computer program that includes machine-readable instructions which, when they are executed on a computer, in a control unit and/or in a control logic, prompt the computer, the control unit or the control logic to carry out a method for functional checking according to the present invention. The present invention likewise relates to a machine-readable data medium or to a download product that includes the computer program.

Additional measures improving the present invention are described in greater detail below with reference to figures, together with the description of the preferred exemplary embodiments of the present invention.

DETAILED DESCRIPTION OF EXAMPLE EMBODIMENTS

Figure 1:
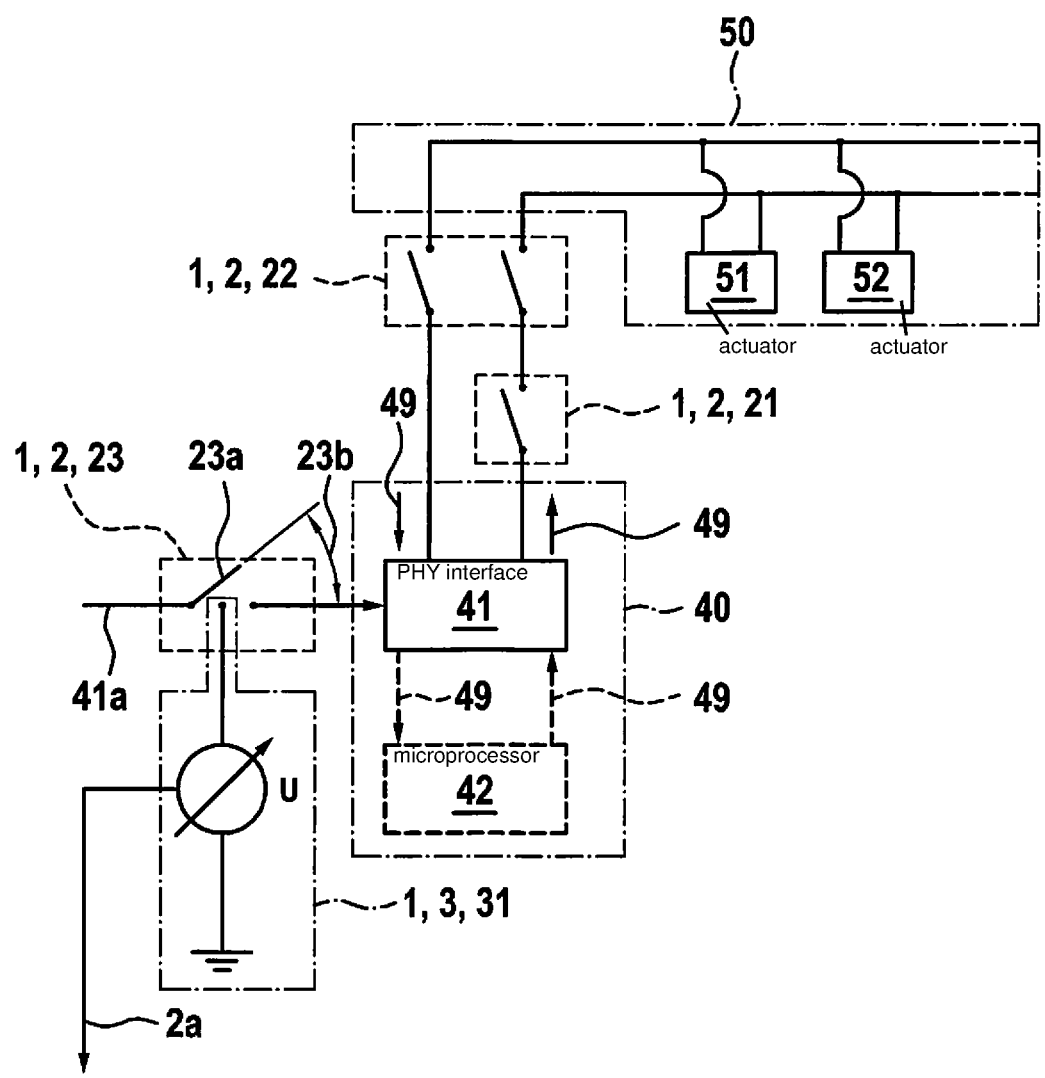
FIG. 1 shows exemplary embodiments for turn-off devices 1.

According to FIG. 1, a control unit 40 delineated by way of example, which includes a microprocessor 42, is connected to a communication network 50 via a PHY interface 41. Microprocessor 42 generates messages 49, which are communicated via PHY interface 41 and communication network 50 to actuators 51 and 52, where they trigger physical actions. The basic idea behind turn-off device 1 is that incorrect physical actions due to incorrect messages 49 may also be prevented, even without direct access to actuators 51 and 52, by suppressing these messages 49. FIG. 1 shows various possibilities as to how this may occur.

Turn-off device 1 may, for example, include a single-pole switch 21 as a blocker 2, which blocks only the transmission path from PHY interface 41 to communication network 50.

Turn-off device 1 may, however, also include a double-pole switch 22 as a blocker 2, which galvanically completely decouples PHY interface 41 from communication network 50. In this way, PHY interface 41 may be prevented, for example, from delivering interference signals to communication network 50 due to a defective semiconductor or from influencing the intrinsic impedance thereof in such a way that the data transmission there is also impaired for other users 51, 52.

Turn-off device 1 may, however, also include a switch 23 as a blocker 2, which blocks power supply 41a of PHY interface 41. The transmission of messages 49 by PHY interface 41 may therefore fail not only because of a physical disconnection of the transmission path, but also because no current is available for transmitting.

Switch 23 is provided in FIG. 1 by way of example with a read-out device 3 for its switching state 2a. Read-out device 3 includes a measuring device 31 for position 23b of switching element 23a. Position 23b functions here as a physical state variable of switching element 23a. Measuring device 31 in this example includes an additional contact, which is connected to power supply 41a of PHY interface 41 when switch 23 is closed. The fact that this connection exists may be established by measuring the voltage U against ground using the voltmeter delineated by way of example.

Figure 2:
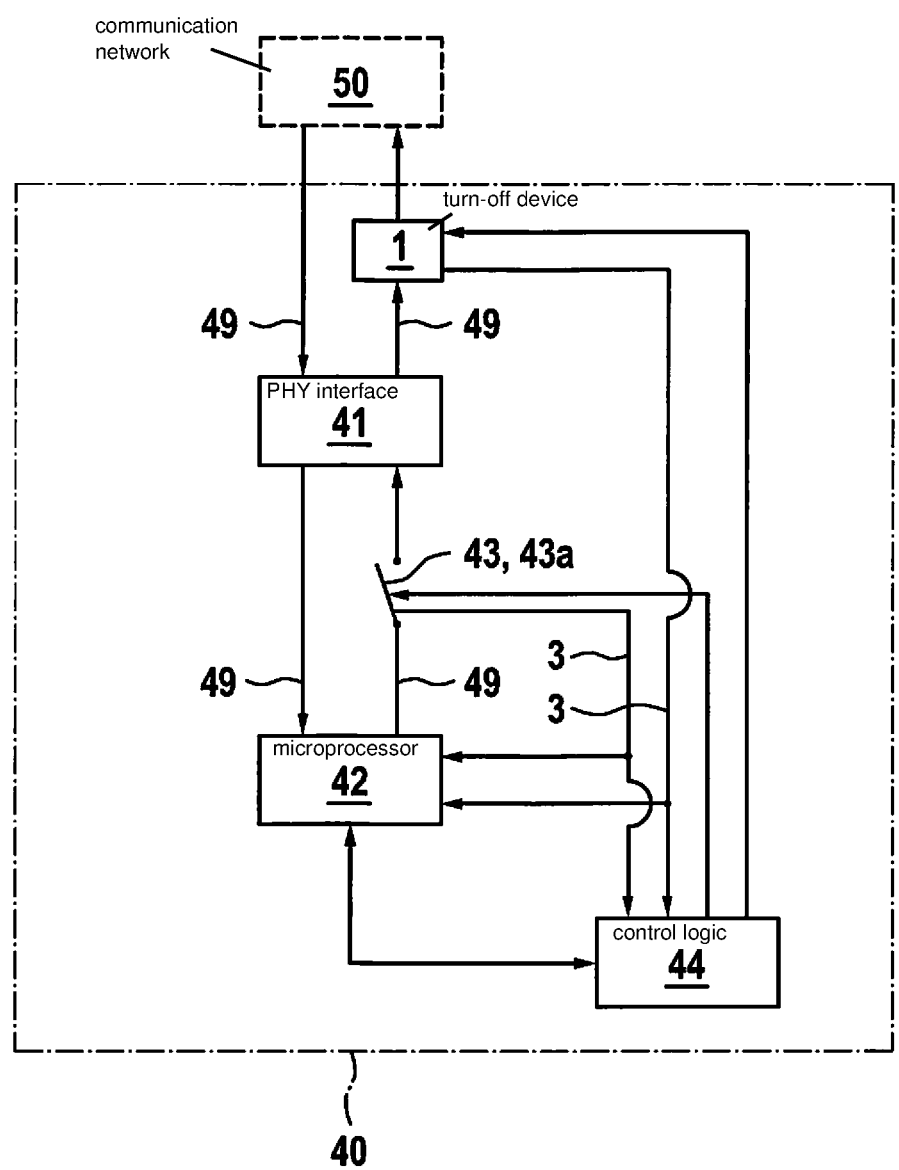
FIG. 2 shows an exemplary embodiment for a control unit 40.

FIG. 2 schematically shows an exemplary embodiment for a control unit 40, which is fitted with a dual-channel turn-off path. Turn-off device 1 in the transmission path from PHY interface 41 to communication network 50 is integrated into control unit 40, in contrast to FIG. 1.

An additional turn-off device 43 is also provided with a blocker 43a, which prevents the transmission of messages 49 from microprocessor 42 to PHY interface 41. Thus, when this blocker 43a is actuated, the effects of errors in microprocessor 42 may be contained, without control unit 40 as a whole having to be deprived of the possibility of transmitting messages 49 into communication network 50.

Additional turn-off device 43 is not limited, however, to merely cutting the transmission path from microprocessor 42 to PHY interface 41, but may, for example, also completely deactivate microprocessor 42.

The correct function of microprocessor 42 is monitored using a control logic 44, which is in bidirectional contact with microprocessor 42. In the event of an error, turn-off device 1 and/or additional turn-off device 43 is/are acted upon by a turn-off signal from control logic 44. Both microprocessor 42 as well as control logic 44 may check via a respective read-out device 3, whether the turn-off was successful.

Control logic 44 may actuate turn-off device 1 and/or additional turn-off device 43, in particular, by testing, and may check for operability via read-out device 3. This may be carried out during the start-up process, for example, once per drive cycle of the vehicle, in which control unit 40 is installed. Thus, the transmission of messages 49 may be prevented by turn-off device 1 and/or by additional turn-off device 43 during the start-up process of control unit 40, so that messages, which are generated, for example, in conjunction with the initialization of microprocessor 42, do not trigger any unintended physical actions on the part of actuators 51, 52.

The test of turn-off device 1 and/or of additional turn-off device 43 may be initiated alternatively also in combination therewith, for example, by microprocessor 42. For this purpose, microprocessor 42 may send a request to control logic 44, which in turn then activates turn-off device 1 or 43.

In the exemplary embodiment shown in FIG. 2, blocker 43a and additional turn-off device 43 are situated outside PHY interface 41. Blocker 43a and/or additional turn-off device 43 may, however, also be advantageously integrated into PHY interface 41, so that these then form a closed unit, which provides the turn-off path.

Figure 3:
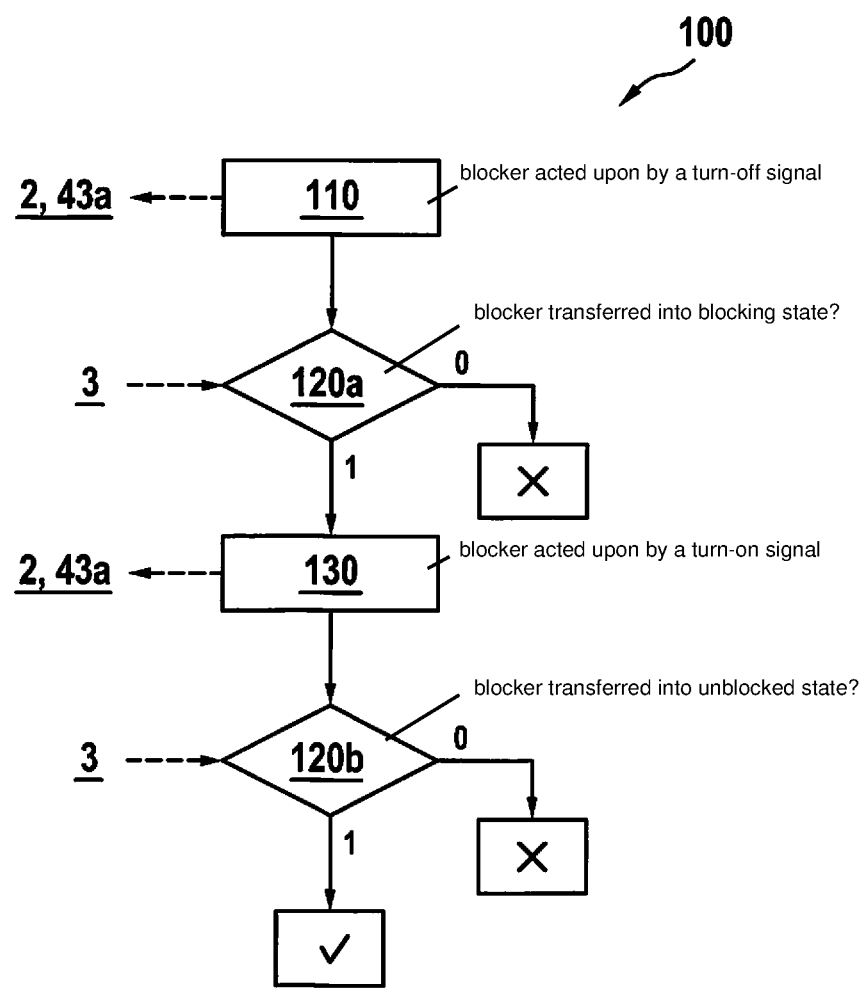
FIG. 3 shows an exemplary embodiment for the method 100 for functional checking.

FIG. 3 schematically shows a first example of a method 100 for checking the function of turn-off device 1, 43. In step 110, blocker 2, 43a is acted upon by a turn-off signal. In step 120a, it is checked with read-out device 3 whether blocker 2, 43a has actually been transferred into the blocked state. If this is not the case (truth value 0) blocker 2, 43a is operating incorrectly (symbol x). If, on the other hand, blocker 2, 43a has been properly transferred into the blocked state (truth value 1), then blocker 2, 43a, is acted upon by a turn-on signal in step 130. In step 120b, it is checked with readout device 3 whether blocker 2, 43a has been transferred back into the unblocked state. If this is not the case (truth value 0), the blocker 2, 43a is operating incorrectly (symbol x). If, on the other hand, blocker 2, 43a has been successfully transferred back into the unblocked state (truth value 1), then it is proven that it is operating properly (symbol ✓).

Figure 4:
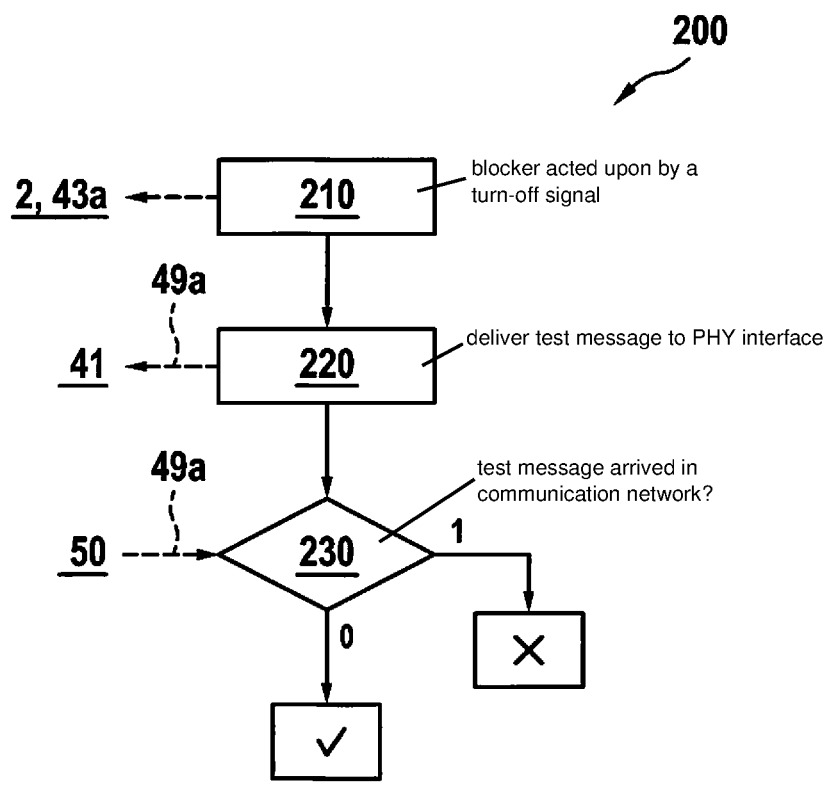
FIG. 4 shows an exemplary embodiment for the method 200 for functional checking.

FIG. 4 schematically shows a second example of a method 200 for checking the function of turn-off device 1, 43. In step 210, blocker 2, 43a is acted upon by a turn-off signal. In step 220, a test message 49a is delivered to the PHY interface. In step 230, it is checked whether test message 49a has arrived in communication network 50. If this is the case (truth value 1), blocker 2, 43a is operating incorrectly (symbol x). If, on the other hand, test message 49a has been successfully suppressed (truth value 0), blocker 2, 43a is then operating properly (symbol ✓).

Similar to FIG. 3, method 200 may be also expanded to the extent that blocker 2, 43a is transferred back into the unblocked state following check 230 and a renewed test message 49a is sent. This renewed test message 49a should then be forwarded into communication network 50.

What is claimed is:

1. A turn-off device for a sensor, an actuator or a control unit for a vehicle or for an industrial facility, the sensor, the actuator or the control unit being connectable via a PHY interface to a communication network, via which the sensor, the actuator or the control unit is able to exchange messages with other units of the vehicle or of the industrial facility, the turn-off device comprising a blocker, which physically prevents the PHY interface from sending messages to the communication network, wherein:
   the turn-off device includes a read-out device for a switching state of the blocker,
   the read-out device includes a measuring device that includes a contact that is connected to a power supply of the PHY interface when the blocker is closed and is not connected to the power supply when the blocker is open, and
   the read-out device generates a switching state signal indicative of the switching state of the blocker, a value of the switching state signal depending on whether the measuring device determines that the contact is connected to the power supply.

2. The turn-off device as recited in claim 1, wherein the blocker includes an electrical or optical switch, via which the transmission path between the PHY interface and the communication network is guided.

3. The turn-off device as recited in claim 1, wherein the blocker includes a multipolar electrical switch, via which both the transmission path as well as the receiving path between the PHY interface and the communication network are guided.

4. The turn-off device as recited in claim 1, wherein the blocker includes an electrical switch, via which the power supply of the PHY interface is guided.

5. The turn-off device as recited in claim 1, wherein the measuring device is for a physical state variable of at least one element, at which the transmission of messages by the PHY interface fails in the blocked state of the blocker.

6. The turn-off device as recited in claim 1, wherein the PHY interface implements at least one physical function in Layer 1 of an Open Systems Interconnection (OSI) model.

7. A sensor, an actuator or a control unit that includes a turn-off device, the sensor, the actuator or the control unit being connectable via a PHY interface to a communication network, via which the sensor, the actuator or the control unit is able to exchange messages with other units of the vehicle or of the industrial facility, the turn-off device comprising a blocker, which physically prevents the PHY interface from sending messages to the communication network, wherein:
   the turn-off device includes a read-out device for a switching state of the blocker, and
   the read-out device includes a measuring device that includes a contact that is connected to a power supply of the PHY interface when the blocker is closed and is not connected to the power supply when the blocker is open, and
   the read-out device generates a switching state signal indicative of the switching state of the blocker, a value of the switching state signal depending on whether the measuring device determines that the contact is connected to the power supply.

8. The sensor, the actuator or the control unit as recited in claim 7, including a microprocessor for generating messages to be sent via the PHY interface, an additional turn-off device being provided with a second blocker, which physically prevents the microprocessor from communicating messages to the PHY interface.

9. The sensor, the actuator or the control unit as recited in claim 8, further comprising:
   a control logic separate from the microprocessor, the control logic being configured to monitor a correct function of the microprocessor and, in the event of an error, to activate the additional turn-off device and/or the turn-off device for the PHY interface, using a turn-off signal.

10. The sensor, the actuator or the control unit as recited in claim 7, wherein the PHY interface implements at least one physical function in Layer 1 of an Open Systems Interconnection (OSI) model.

* * * * *